UNITED STATES PATENT OFFICE.

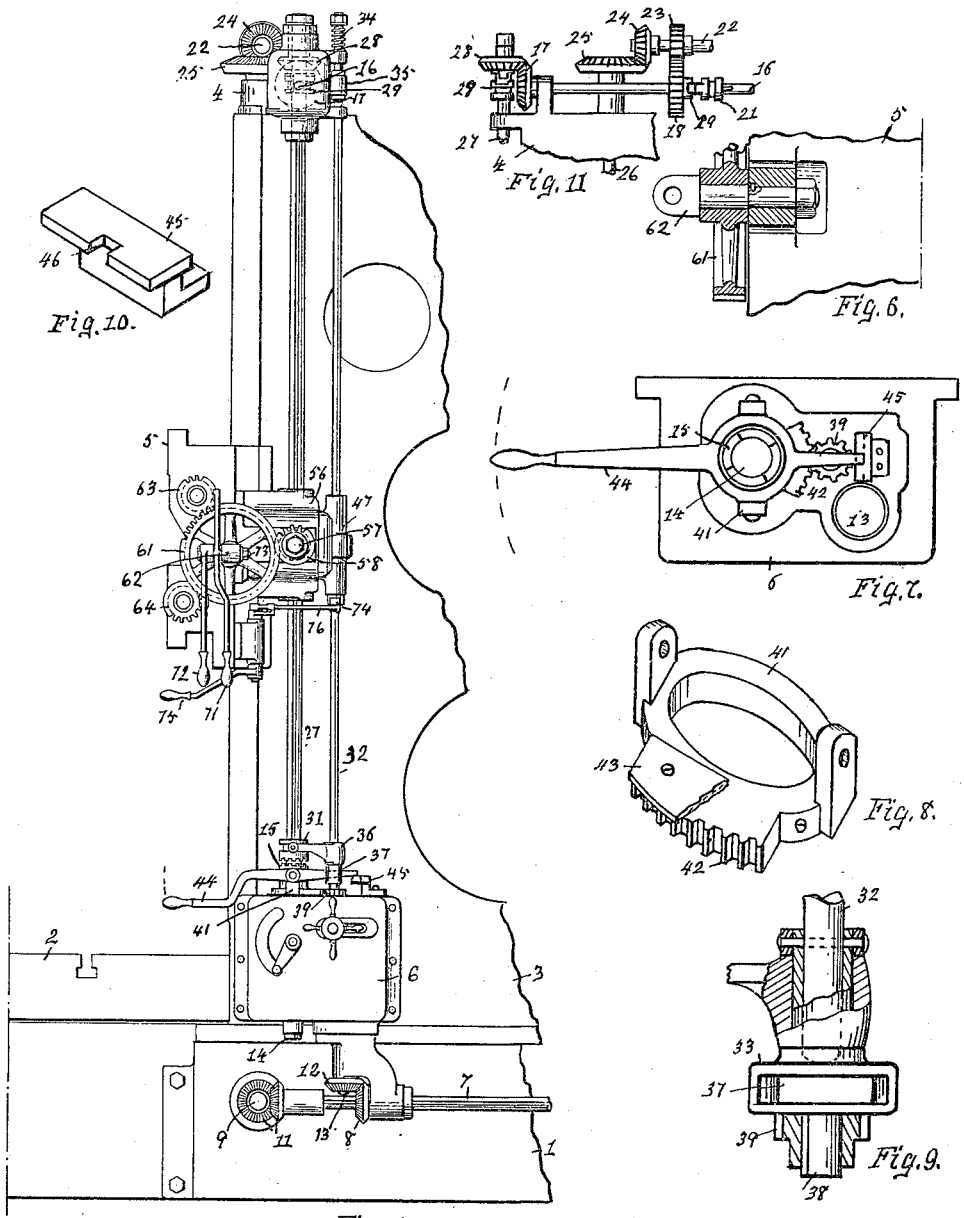

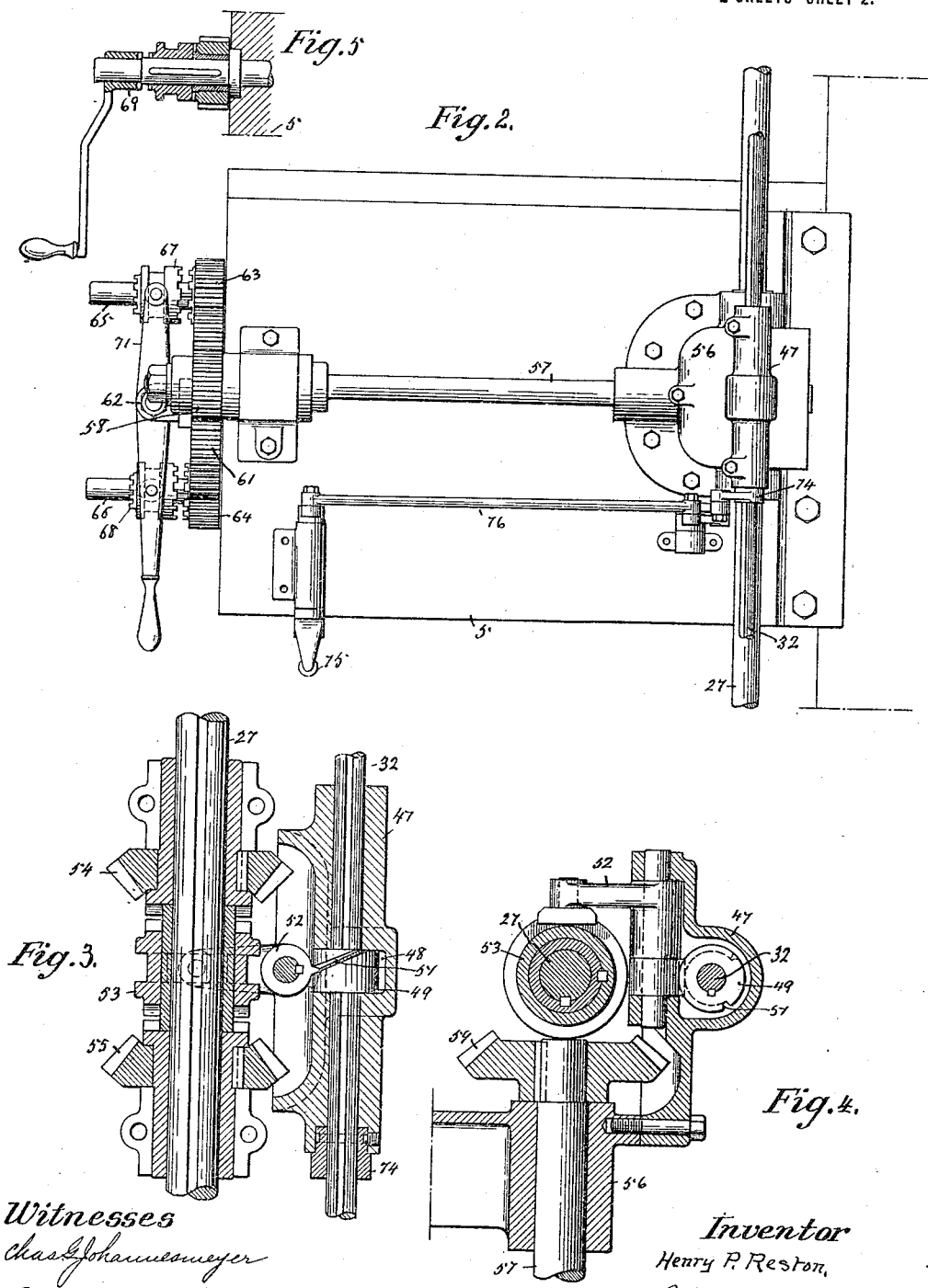

HENRY PERCY RESTON, OF OAKLEY, OHIO, ASSIGNOR TO THE CINCINNATI PLANER COMPANY, OF OAKLEY, OHIO, A CORPORATION OF OHIO.

CLUTCH-SHIFTING MECHANISM.

1,137,716.  Specification of Letters Patent.  Patented Apr. 27, 1915.

Application filed October 2, 1911. Serial No. 652,428.

*To all whom it may concern:*

Be it known that I, HENRY PERCY RESTON, a citizen of England, residing at Oakley, Ohio, have invented a new and useful Improvement in Clutch-Shifting Mechanism, of which the following is a specification.

My invention relates to clutch shifting mechanism of the class adapted to the use of machine tools or for other suitable purposes, and the objects of my improvements are to provide novel construction and arrangement of the clutch connections and actuating levers for controlling the different speeds of the feed shafts; and to provide durable construction and compact assemblage of the various parts for securing facility of operation with accuracy and efficiency of action. These objects may be attained in the following described manner, as illustrated in the accompanying drawings, in which:—

Figure 1 is a side elevation of portions of a metal boring mill embodying my improvements; Fig. 2 a rear view of a portion of the cross rail with its connections; Figs. 3 and 4 longitudinal and transverse sections respectively of the clutch shifting mechanism for the rail shaft; Fig. 5 a longitudinal section of the crank handle connection with the feed screws; Fig. 6 a longitudinal section of the intermediate gear showing the shifting lever bearing; Fig. 7 a plan of the speed box with shifting lever connections; Fig. 8 an isometrical view of the collar bearing swiveled on the speed box; Fig. 9 an elevation with parts in section of the slotted housing on the shifting rod; Fig. 10 an isometrical view of the guide for the shifting lever and Fig. 11 a rear elevation of portions of the driven shaft and gear connections mounted on the housing.

In the drawings, 1 represents the bed of a boring mill, 2 the circular table rotatively mounted thereon and driven in the usual manner, and 3 the housing adjustably secured on the bed in relation to the table and provided with a top rail 4 and with a vertically adjustable cross-rail 5. The speed box 6 inclosing the ordinary change speed gears (not shown) is secured on the housing 3 and adjustable therewith on the bed. The longitudinal shaft 7 with the bevel gear 8 splined thereon is driven from the slow speed driving shaft 9 through the bevel gears 11. A bevel gear 12 on the driving shaft 13 of the speed box engages with gear 8. The change speed shaft 14 of the speed box is provided with a clutch member 15 and may be driven at different speeds from shaft 13 in the ordinary manner. The high speed driving shaft 16 mounted on the top rail is provided with a bevel gear 17 and with a loose gear 18 having a clutch face 19 adapted to coöperate with the clutch member 21. A transverse shaft 22 mounted on the top rail is provided with a pinion 23 engaging with gear 18 and also with bevel pinion 24 engaging with gear 25 which is secured to the screw shaft 26 for controlling the vertical adjustment of the cross rail 5 in the ordinary manner.

The vertical feed shaft 27 mounted on the housing in alinement with the speed shaft 14 is provided with a loose gear 28 engaging with the gear 17 and formed with a clutch face. Clutch members 29 and 31 splined on the feed shaft are adapted to coöperate respectively with the clutch gear 28 and the clutch member 15 for driving said shaft alternately at high or low speeds as desired.

The vertical shifting rod 32 mounted on a coupling 33 and adjustable therewith both longitudinally and rotatively is maintained under a yielding pressure in predetermined longitudinal position by means of a spring 34. Shifting yokes 35 and 36 for the clutch members 29 and 31 are swiveled on said rod and movable longitudinally therewith. The coupling 33 is formed with a transverse slot 37 and with a depending stud 38 whereon a pinion 39 is splined and journaled in the top of the speed box 6. A collar 41 swiveled on the speed box concentric with shaft 14 is formed with a segmental gear 42 engaging with pinion 39 and a flange 43 secured thereon projects over the edge of the pinion to maintain it in proper longitudinal position. A shifting lever 44 trunnioned on collar 41 is extended through the slot 37 and terminates in movable engagement with the horizontal guide plate 45. Said guide plate is secured on the speed box 6 and formed with a gap 46 in its central portion for the vertical movement therethrough of the point of lever 44. Said lever may be moved with its point vertically through said gap for shifting the coupling and the shifting rod longitudinally for alternately engaging the clutch members 29 and 31 with their coöperating members 28 and 15. Clutch member 29 may be maintained in engagement with gear 28 by moving lever 44 laterally in either direction with its point in sliding engagement with the top surface of the guide 45 and by likewise moving the lever with its point under said guide the clutch member 31 may be locked in engagement with member 15. The lateral movement of lever 44 also actuates the collar 41 with the segmental gear 42 and pinion 39 for rotatively adjusting the shifting rod 32 in either of opposite directions and only during the engagement of either one of the clutch members 29 and 31 with the coöperating members.

An intermediate bearing 47 for the shifting rod 32 is secured to the cross rail 5 and formed with a transverse gap 48. A collar 49 formed with a helical groove 51 in its face is splined on said rod within said gap as shown in Figs. 3 and 4. A lever 52 fulcrumed on bearing 47 slidingly engages at one end within the groove 51 and at the other end with the double clutch member 53 which is splined on the feed shaft 27 for shifting said clutch member by the rotative adjustment of the shifting rod. Oppositely disposed bevel gears 54 and 55 each formed with a clutch face adapted to coöperate with the clutch member 53 and loose upon the feed shaft 27 are journaled in bearings 56 secured on the cross rail 5. The shaft 57 journaled on the cross rail is provided with a pinion 58 and with a bevel gear 59 in continuous engagement with the loose gears 54 and 55. An intermediate gear 61 engaging with pinion 58 is mounted to turn on an eye bolt or stud 62 which is removably secured in the end of the cross rail as shown in Fig. 6. Pinions 63 and 64 engaging with the intermediate gear 61 and each formed with a clutch face are mounted to turn on the rail feed screws 65 and 66 for feeding the tool heads (not shown) thereon in the ordinary manner. Double clutch members 67 and 68 splined on said respective screws coöperate at one end with the clutch pinions 63 and 64 and at the other end with a crank clutch 69 which may be removably engaged therewith as shown in Fig. 5. Shifting levers 71 and 72 for the respective members 67 and 68 are fulcrumed on a stud 73 which is secured in the eye-bolt 62. A crank collar 74 is splined on the shifting rod 32 and swiveled in the bearing 47 may be actuated by the hand lever 75 through its connections 76 therewith for rotatively adjusting said rod for shifting the clutch member 53 when desired.

In operation, the feed shaft 27 may be engaged with either the speed box shaft 14 or the high speed shaft 16 by means of the shifting lever 44 and its detachable connections with said shafts. The rotative adjustment of the shifting rod 32 by means of either of the levers 44 or 75 through their connections therewith serves to shift the clutch member 53 into engagement with either of the gears 54 or 55 for driving the feed screws 65 and 66 in either of opposite directions from gear 59 through its detachable connections therewith. Hand levers 71 and 72 are conveniently accessible to the operator for detachably engaging said feed screws with the said driving connections from gear 59. The removable crank clutch member 69 serves to effect independent rotative adjustment of the feed screws when they are disengaged from the driven pinions 63 and 64. The speed box being secured on the housing and adustable therewith in relation to the table makes it conveniently accessible to the operator at all times without interference by the projection thereover of articles carried by the table.

Having fully described my improvement what I claim as my invention and desire to secure by Letters Patent of the United States is:—

1. The combination of a driven shaft, idle gears thereon each formed with a clutch member, a double clutch member splined on the shaft and movable into alternate engagement with the gears, a shifting rod provided with a pinion, a segmental gear engaging with the pinion, a lever trunnioned thereon for turning the gear and the pinion with the rod, and shifting connections with the double clutch member arranged to be actuated by the rotative movement of the rod.

2. The combination of two shafts having different speeds, an intermediate shaft, clutch connections therefrom with said respective shafts, a shifting rod movable longitudinally for alternately engaging said connections, idle gears on the intermediate shaft each formed with a clutch member, a double clutch member splined on said shaft and shifting connections therewith arranged to be actuated by the rotative movement of the rod for alternately engaging said member with the gears.

3. The combination of a shaft, driving and driven connections therewith, a shifting rod for actuating said connections, a pinion thereon, a segmental gear engaging with the pinion, a lever trunnioned thereon for alternately shifting the rod longitudinally, and rotatively, and a fixed guide for controlling the alternate movements of the lever.

4. The combination of a shaft journaled in fixed bearings, bevel gears each formed with a clutch member and mounted to turn thereon, a coöperating double clutch member splined on said shaft, a shifting rod journaled in fixed bearings, a collar splined thereon and formed with a helical groove, a shifting yoke pivotally supported at a fixed point and movably engaging with the groove, and gear connections arranged to be actuated by a lever for turning the rod for shifting the double clutch member into alternate engagement with the gears.

5. The combination of a driving shaft, a driven shaft having clutch connections therewith, a double clutch member splined on the driven shaft, a shifting rod, shifting connections therefrom with the double clutch member arranged to be actuated by the rotative adjustment of the rod, means actuated by the longitudinal movement of the rod for actuating the clutch connections on the driven shaft, and a lever and gear mechanism arranged to adjust the rod both rotatively and longitudinally.

6. The combination of a driving and a driven shaft, a shifting rod, clutch connections between said shafts arranged to be actuated by the longitudinal movement of the rod, a double clutch member splined on the driven shaft and arranged to be actuated by the rotative movement of the rod, a pinion splined on the rod, a gear engaging therewith and a lever fulcrumed on the gear for shifting the rod longitudinally and also for moving the gear and pinion with the rod rotatively, for the purpose specified.

7. The combination of two shafts driven at different speeds, an intermediate shaft, clutch connections therefrom with said respective shafts, a shifting rod movable longitudinally for actuating said clutch connections alternately, loose gears on the intermediate shaft each formed with a clutch member, a coöperating double clutch member splined on the intermediate shaft between said gears, shifting connections therefrom with said shifting rod and arranged to be actuated by the rotative adjustment thereof, a pinion splined on the shifting rod, a gear engaging therewith and a lever fulcrumed on the gear and movable in perpendicular planes for adjusting the rod both longitudinally and rotatively.

HENRY PERCY RESTON.

Witnesses:
   CHAS. G. JOHANNESMEYER,
   R. S. CARR.

Copies of this patent may be obtained for five cents each, by addressing the "Commissioner of Patents, Washington, D. C."